(12) United States Patent
Gupta et al.

(10) Patent No.: US 8,027,327 B2
(45) Date of Patent: Sep. 27, 2011

(54) DISTRIBUTED SCHEDULING IN WIRELESS NETWORKS WITH SERVICE DIFFERENTIATION

(75) Inventors: Piyush Gupta, Piscataway, NJ (US); Yogesh Sankarasubramaniam, Metz (FR); Aleksandr Stolyar, Basking Ridge, NJ (US)

(73) Assignee: Alcatel Lucent, Paris (FR)

( * ) Notice: Subject to any disclaimer, the term of this patent is extended or adjusted under 35 U.S.C. 154(b) by 1606 days.

(21) Appl. No.: 10/876,808

(22) Filed: Jun. 25, 2004

(65) Prior Publication Data

US 2005/0286477 A1 Dec. 29, 2005

(51) Int. Cl.
*H04B 7/212* (2006.01)

(52) U.S. Cl. ......... 370/348; 370/344; 370/345; 370/346

(58) Field of Classification Search .................. 370/229, 370/231, 235, 336, 343, 322, 442, 449, 344–48, 370/3
See application file for complete search history.

(56) References Cited

U.S. PATENT DOCUMENTS

| | | | | |
|---|---|---|---|---|
| 5,353,287 A | * | 10/1994 | Kuddes et al. | ................. 370/448 |
| 5,742,592 A | * | 4/1998 | Scholefield et al. | .......... 370/329 |
| 6,078,568 A | | 6/2000 | Wright et al. | |
| 6,590,890 B1 | | 7/2003 | Stolyar et al. | |
| 6,678,252 B1 | | 1/2004 | Cansever | |
| 6,990,087 B2 | | 1/2006 | Rao et al. | |
| 7,127,519 B2 | | 10/2006 | Li | |
| 2002/0041578 A1 | | 4/2002 | Kim et al. | |
| 2002/0142721 A1 | | 10/2002 | Souissi et al. | |
| 2002/0181395 A1 | | 12/2002 | Foster et al. | |
| 2003/0152041 A1 | | 8/2003 | Herrmann et al. | |
| 2004/0043782 A1 | | 3/2004 | Gupta | |
| 2005/0002364 A1 | * | 1/2005 | Ozer et al. | ..................... 370/338 |
| 2005/0007997 A1 | | 1/2005 | Morton et al. | |
| 2005/0058151 A1 | | 3/2005 | Yeh | |
| 2005/0068922 A1 | | 3/2005 | Jalali | |
| 2005/0157676 A1 | | 7/2005 | Kwak et al. | |
| 2005/0272423 A1 | | 12/2005 | Stephens et al. | |
| 2006/0056382 A1 | | 3/2006 | Yamada et al. | |
| 2006/0211441 A1 | | 9/2006 | Mese et al. | |
| 2006/0264229 A1 | | 11/2006 | Guo et al. | |
| 2006/0268792 A1 | | 11/2006 | Belcea | |
| 2007/0064721 A1 | | 3/2007 | Garcia-Luna-Aceves | |
| 2007/0076631 A1 | | 4/2007 | Gupta et al. | |
| 2007/0110000 A1 | | 5/2007 | Abedi | |
| 2007/0263657 A1 | | 11/2007 | Sugar et al. | |
| 2008/0009306 A1 | | 1/2008 | Suga et al. | |

(Continued)

OTHER PUBLICATIONS

IEEE Journal on Selected Areas in Communications, vol. 19, No. 10, Oct. 2001 "Supporting Service Differentiation in Wireless Packet Networks Using Distributed Control" Andras Veres, Andrew T. Campbell, Michael Barry, Member, IEEE, and Li-Hsiang Sun, Student Member, IEEE; pp. 2086-2087.*

(Continued)

*Primary Examiner* — Kent Chang
*Assistant Examiner* — Dung Lam
(74) *Attorney, Agent, or Firm* — Hitt Gaines, PC (57) ABSTRACT

An apparatus includes a first node configured to transmit both data frames and requests for channel reservations to a local contention neighborhood of a network. The first node is configured to compete with other nodes of the neighborhood for reservations to the channel. The first node is configured to dynamically update a stored value of an access priority for the first node and to transmit said requests with a rate that depends on the stored value.

26 Claims, 5 Drawing Sheets

U.S. PATENT DOCUMENTS

2008/0137577 A1  6/2008  Habetha
2008/0175149 A1  7/2008  Andrews et al.

OTHER PUBLICATIONS

I. Akyildiz, et al, "A Survey on Sensor Networks," *IEEE Commun. Mag.*, vol. 40, No. 8, pp. 102-114, Aug. 2002.

V. Anantharam, "The Stability Region of the Finite-User Slotted ALOHA Protocol," *IEEE Trans. Inform. Theory*, vol. 37, No. 3, pp. 535-540, May 1991.

M. Andrews, et al, "Providing Quality of Service Over a Shared Wireless Link," *IEEE Commun. Mag.*, vol. 39, No. 2, pp. 150-154, Feb. 2001.

G. Mergen, et al, "Random Scheduling Medium Access for Wireless Ad Hoc Networks" *School of Electrical and Computer Engineering*, Cornell University, Ithaca, NY 14853, 5 pages, Mar. 2003.

G. Bianchi, "Performance Analysis of the IEEE 802.11 Distributed Coordination Function," *IEEE J. Selected Areas Commun.*, vol. 18, No. 3, pp. 535-547, Mar. 2000.

J. Deng, et al, "Dual Busy Tone Multiple Access (DBTMA): A New Medium Access Control for Packet Radio Networks," *Proc. IEEE ICUPC Conf.*, Florence, Italy, Oct. 1998.

R. Gallager, "A Perspective on Multiaccess Channels," *IEEE Trans. Inform. Theory*, vol. IT-31, No. 2, pp. 124-142, Mar. 1985.

S. Ghez, et al, "Stability Properties of Slotted ALOHA with Multipacket Reception Capability," *IEEE Trans. Automatic Contr.*, vol. AC-33, No. 7, pp. 640-649, 1988.

S. Ghez, et al, "Optimal Decentralized Control in the Random Access Multipacket Channel," *IEEE Trans. Automatic Contr.*, vol. AC-34, No. 11, pp. 1153-1163, 1989.

P. Gupta, et al, "The Capacity of Wireless Networks," *IEEE Trans. Inform. Theory*, vol. IT-46, No. 2, pp. 388-404, Mar. 2000.

B. Hajek, et al, "Decentralized Dynamic Control of a Multiaccess Broadcast Channel," *IEEE Trans. Automatic Contr.*, vol. AC-27, No. 3, pp. 559-569, 1982.

A. Parekh, et al, "A Generalized Processor Sharing Approach to Flow Control in Integrated Services Networks: The Single-Node Case," *IEEE/ACM Trans. Networking*, vol. 1, No. 3, pp. 344-357, Jun. 1993.

T. Saadawi, et al, "Analysis, Stability, and Optimization of Slotted ALOHA with a Finite Number of Buffered Users," *IEEE Trans. Automatic Contr.*, vol. AC-26, No. 3, pp. 680-689, Jun. 1981.

J. Sant, et al, "Performance Analysis of a Slotted-ALOHA Protocol on a Capture Channel with Fading," *Queueing Systems*, vol. 34, pp. 1-35, 2000.

V. Sharma, "Stability and Continuity of Slotted ALOHA with Stationary Non-Independent Input Traffic," *J. Appl. Probab.*, vol. 25, pp. 797-807, 1988.

F. Tobagi, et al, "Packet Switching in Radio Channels: Part II-The hidden Terminal Problem in Carrier Sense Multiple-Access and the Busy-Tone Solution," *IEEE Trans. Commun.*, vol. 23, No. 12, pp. 1417-1433, Dec. 1975.

B. Tsybakov, et al, "Ergodicity of Slotted ALOHA System," *Probl. Inform. Transmission*, vol. 15, pp. 73-87, Mar. 1979.

B. Tsybakov, "Survey of USSSR Contributions to Random Multiple-Access Communications," *IEEE Trans. Inform. Theory*, vol. IT-31, No. 2, pp. 143-165, Mar. 1985.

A. Veres, et al, "Supporting Service Differentiation in Wireless Packet Networks Using Distributed Control," *IEEE Jour. Sel. Areas Commun.*, vol. 19, No. 10, pp. 2081-2093, Oct. 2001.

F. Baccelli, et al, "An Aloha Protocol for Multihop Mobile Wireless Networks," *Proc. 41st Annual Allerton Conf. on Commun., Control, and Computation*, (Monticello, IL), Oct. 2003, pp. 1655-1664.

P. Karn, "MACA[1]—A New Channel Access Method for Packet Radio," *Amateur Radio 9th Computer Networking Conf.*, 1990, pp. 134-140.

V. Naware, "Stability of Slotted ALOHA with Spatial Diversity," *IEEE Trans. Inform. Theory*, Nov. 2003, pp. 463-467.

R. Rozovsky, et al, "SEEDEX: A MAC Protocol for Ad Hoc Networks," *Proc. ACM MobiHoc'01*, Long Beach, CA, Oct. 2001, pp. 67-75.

S. Shakkottai, et al, "Scheduling Algorithms for a Mixture of Real-Time and Non-Real-Time Data in HDR," *Proc. 17th Intl. Teletraffic Congress—ITC-17*, Salvador da Bahia, Brazil, Sep. 2001, pp. 793-804.

V. Bharghavan et al, "MACAW: A medium access protocol for wireless LANs," in Proc. ACM SIGCOMM '94 (Aug. 1994) 14 pages.

Distributed Algorithms for Max-Min Fair Rate Allocation in ALOHA Networks; Xin Wang et al.; 10 pages, Sep. 2004.

Achieving Proportional Fairness using Local Information in Aloha Networks; Koushik Kar et al.; 13 pages, Oct. 2004.

Maximizing Queueing Network Utility Subject to Stability: Greedy Primal-Dual Algorithm; Alexander Stolyar; 2005; pp. 401-457.

Random-Access Scheduling with Service Differentiation in Wireless Networks; Piyush Gupta et al.; 11 pages, Mar. 2005.

Optimal Utility Based Multi-User Throughput Allocation subject to Throughput Constraints; Matthew Andrews et al.; 10 pages, Mar. 2005.

On the Asymptotic Optimality of the Gradient Scheduling Algorithm for Multiuser Throughput Allocation; Alexander L. Stolyar; vol. 5, No. 1, Jan.-Feb. 2005, pp. 12-25.

Maxweight Scheduling in a Generalized Switch: State Space Collapse and Workload Minimization in Heavy Traffic; Alexander L. Stolyar; 2004, vol. 14, No. 1, pp. 1-53.

The Collision Channel Without Feedback; James L. Massey; IEEE Transactions on Information Theory, vol. IT-31, No. 2, Mar. 1985; pp. 192-204.

Convexity of the Nonachievable Rate Region for the Collision Channel Without Feedback; Karel A. Post; IEEE Transactions on Information Theory, vol. IT-31, No. 2, Mar. 1985; pp. 205-206.

Throughput Region of Random Access Networks of General Topology; Piyush Gupta et al.; Mar. 10, 2005; pp. 1-19.

Mathematical modeling of the Internet; Frank Kelly; Jul. 1999; pp. 1-20.

* cited by examiner

DISTRIBUTED SCHEDULING IN WIRELESS NETWORKS WITH SERVICE DIFFERENTIATION

The U.S. Government has a paid-up license in this invention and the right in limited circumstances to require the patent owner to license others on reasonable terms as provided for by the terms of grant No. CCR-0325673 awarded by the National Science Foundation.

BACKGROUND

1. Field of the Invention

This invention relates to methods and apparatus for scheduling accesses to a shared communications channel.

2. Discussion of the Related Art

Recently, the popularity of wireless local area networks (WLANs) has surged. Now, WLANs provide data connectivity in places such as offices, homes, campuses, and supermarkets. WLANs have even become an integral part of many next-generation communications networks.

A WLAN typically operates without completely centralized control of accesses to the shared wireless channel. Scheduling accesses to a channel without complete centralized control of the accesses is typically referred to as distributed scheduling. In distributed scheduling, the nodes of a local contention neighborhood compete for access to the channel. In particular, the nodes individually determine whether to attempt to access the channel. For that reason, two of the nodes may transmit to the channel during time periods that overlap.

When two transmissions to a channel temporally overlap the transmissions collide. In a wireless channel, a collision often jumbles both transmissions so that a receiver cannot determine the complete content of either transmission. Thus, the colliding transmissions typically have to be resent, and the collision causes an effective reduction in communications bandwidth in a wireless channel.

Though collisions are inherent to distributed scheduling, methods are available for reducing the undesired effects of collisions. Some methods synchronize the temporal slots for transmissions in the channel so that the nodes of a local contention neighborhood agree on the boundaries of time slots for transmissions. For that reason, the nodes of the neighborhood will wait for the beginning of a time slot to attempt a new transmission. This synchronization typically lowers collision rates thereby increasing the bandwidth effectively available for transmissions. Some methods use time periods for competing for channel reservations and separate time periods for transmitting data frames. These methods limit collisions to the time periods reserved for competing for channel reservations. By making the time periods reserved for the transmitting data frames long compared to those reserved for competing for channel reservations these later methods can also reduce effective bandwidth losses associated with collisions.

While the above-described methods help to reduce effective bandwidth losses due to collisions such losses still occur when distributed scheduling is used.

SUMMARY

Various embodiments provide distributed scheduling in a manner that regulates contention between nodes of a local contention neighborhood.

One embodiment features an apparatus that includes a first node configured to transmit both data frames and requests for channel reservations to a local contention neighborhood of a network. The first node is configured to compete with other nodes of the neighborhood for reservations to the channel. The first node is configured to dynamically update a stored value of an access priority for the first node and to transmit said requests with a rate that depends on the stored value.

Another embodiment features a system including a plurality of nodes capable of transmitting data frames in a local contention neighborhood of a wireless network. The nodes are configured to compete with each other for access to a shared channel of the wireless network. Each node is configured to store and dynamically update an associated access priority variable. A probability of one of the nodes of requesting access to the channel depends on a value of the access priority variable stored in the one of the nodes.

Another embodiment features a method that includes storing a value of an access priority for a first node of a local contention neighborhood. The neighborhood includes a plurality of other nodes that compete with the first node for access to a shared channel. The method includes transmitting a plurality of requests to reserve the channel from the first node. The rate of the transmitting said requests depends on the stored value of the access priority. The storing includes updating the stored value of the access priority between transmitting ones of the requests.

Another embodiment features a method. The method includes monitoring for requests of channel reservations to nodes of a local contention neighborhood or grants of channel reservations to the nodes of a local contention neighborhood. The monitoring is performed by one of the nodes. The method includes updating a value of an access threshold stored in the one of the nodes in response to the monitoring sensing a grant of a channel reservation to one of the other nodes. The updating replaces the stored value of the access threshold with a value from the sensed grant. The method also includes transmitting a request for a channel reservation from the one of the nodes in response to an access priority of the one of the nodes passing a threshold associated with the stored value of the access threshold.

Another embodiment features a system for distributed scheduling. The system includes a plurality of nodes belonging to a local contention neighborhood. Each node is configured to transmit requests for channel reservations and data frames to other nodes of the neighborhood and is able to compete with the other nodes for access to the channel. Each node is configured to store a value for an access contention level in the neighborhood and to transmit the requests at a rate that decreases as the stored value increases. Each node is also configured to decrease the stored value in a manner proportional to the stored value in response to sensing a successful transmission of a request for a channel reservation in the neighborhood.

Another embodiment features a method for operating a node in a wireless network. The method includes receiving a request for a channel reservation from a first node of a local contention neighborhood of the network and transmitting a grant of the channel reservation to the local contention neighborhood in response to the deciding to grant the request from the first node. The transmitted grant includes a new value of a channel access threshold for the neighborhood. Nodes of the neighborhood whose access priorities are below a threshold fixed by the channel access threshold are unable to transmit a request for a channel reservation.

Herein, various methods may be encoded as one or more sequences of instructions in computer executable form on a program storage medium. Exemplary program storage media

Various embodiments are described more fully by the figures and detailed description. The inventions may, however, be embodied in various forms and are not limited to the embodiments described in the figures and detailed description.

DETAILED DESCRIPTION OF ILLUSTRATIVE EMBODIMENTS

Figure 1:
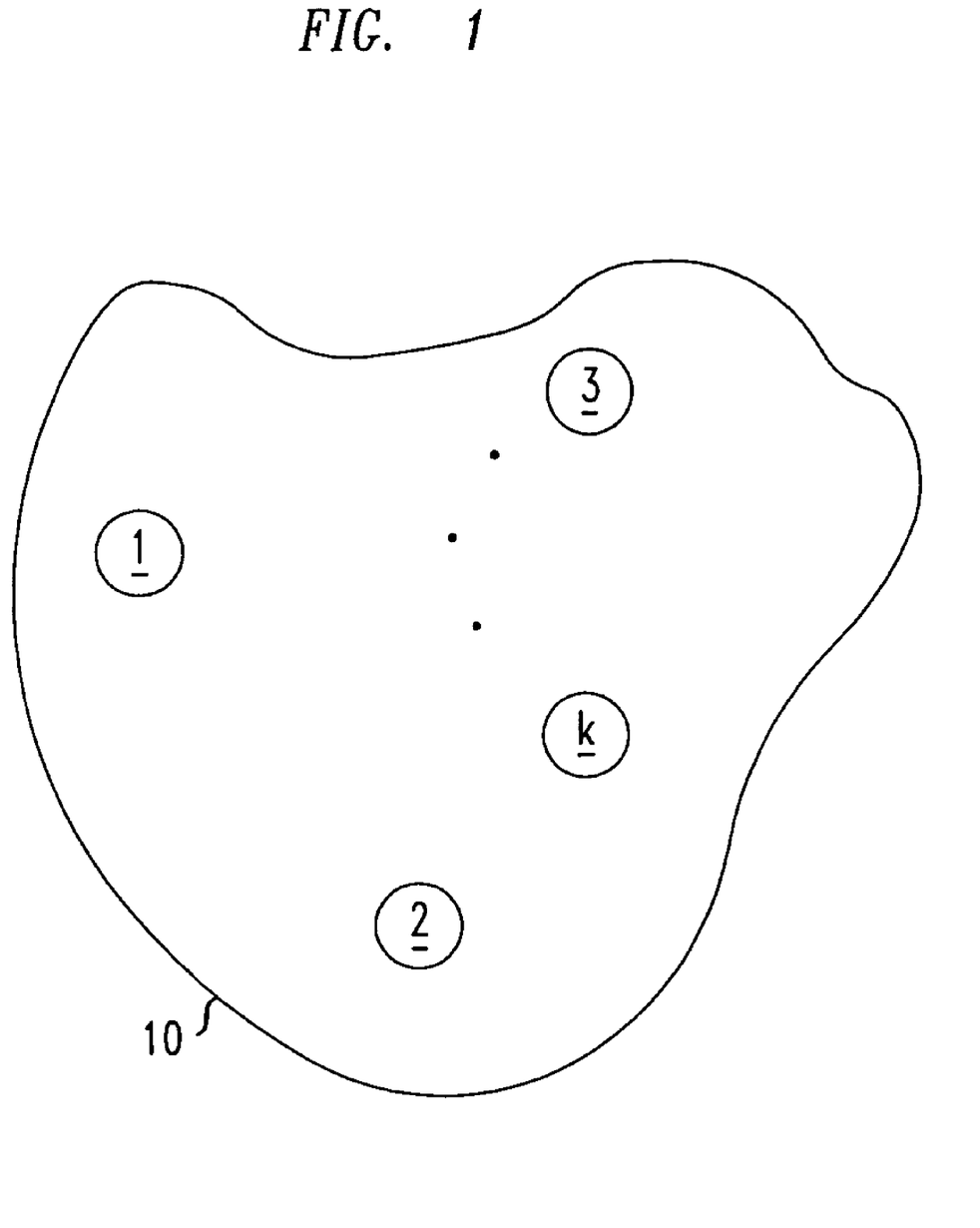
FIG. 1 shows an exemplary local contention neighborhood of a wireless data network (WDN)

FIG. 1 shows an exemplary a local contention neighborhood 10 of a wireless data network (WDN), e.g., a WLAN, an ad hoc wireless network, or a wireless sensor network. The local contention neighborhood includes a plurality of nodes 1, 2, 3, . . . k. In a local contention neighborhood, each node 1 . . . k is able to transmit data frames to one or more nodes 1 . . . k therein and is able to receive data frames from one or more of the nodes 1 . . . k therein. Furthermore, the nodes 1 . . . k are also able to transmit requests for reservations of a shared communication channel to one or more of the nodes 1 . . . k of the neighborhood, and the one or more nodes 1 . . . k are able to transmit grants of said requests. The grants may be transmitted by nodes 1 . . . k that are targets of transmissions of data frames or by a designated node in the local contention neighborhood 10.

The local contention neighborhood 10 operates by a distributed scheduling scheme in which nodes 1 . . . k compete among themselves for access to the wireless channel. The nodes 1 . . . k operate according to a carrier sense protocol in which the nodes 1 . . . k listen for transmissions in the local contention neighborhood 10. The nodes 1 . . . k decide whether to request a reservation of the shared channel based in part on limited information obtained through said carrier sensing. The limited information will not ensure a node, e.g., that no other node of the neighborhood will simultaneously transmit a request for a channel reservation.

Figure 2:
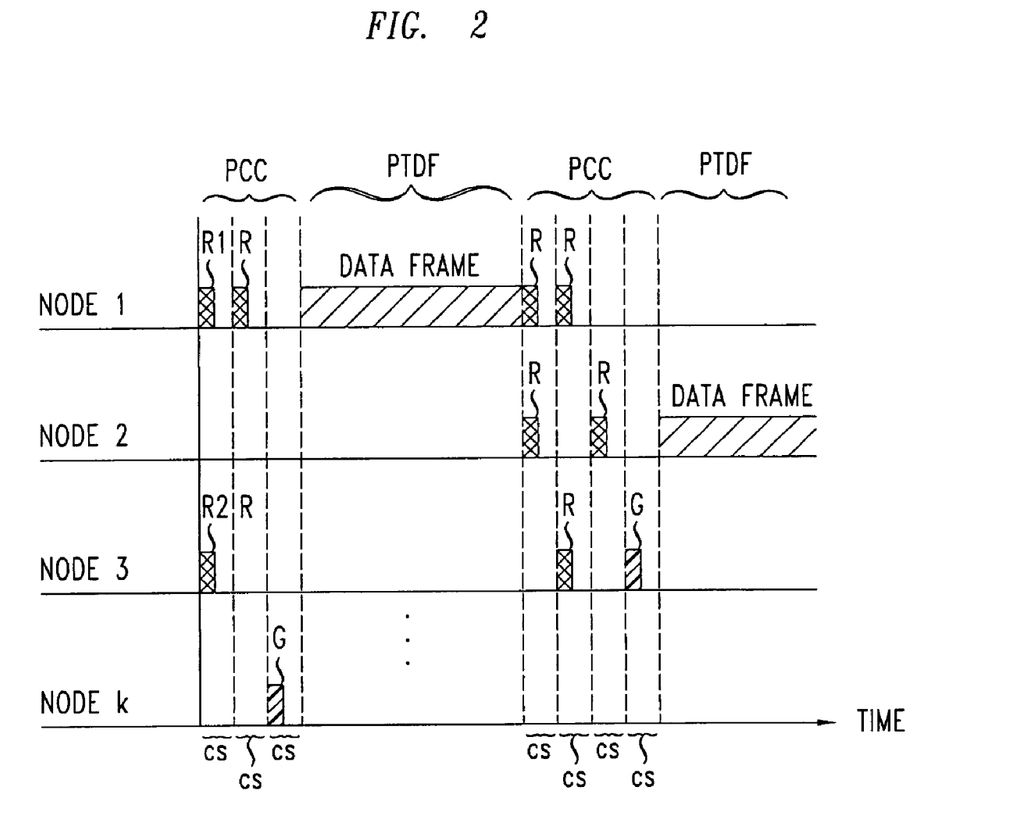
FIG. 2 is a timing diagram that illustrates operation of the local contention neighborhood of FIG. 1.

FIG. 2 is a timing diagram illustrating one protocol in local contention neighborhood 10. The protocol is time-slotted protocol and includes periods for channel contention (PCC) and separate periods for transmissions of data frames (PTDF). In the embodiment of FIG. 2, each PCC includes one or more contention time slots (CS) in which nodes 1 . . . k of the neighborhood 10 may compete for the right to subsequently transmit a data frame on the shared wireless channel. At the start of a CS, nodes 1 . . . k determine whether to transmit requests (R) for a channel reservation according to random processes. The requests are received by a target node 1 . . . k, e.g., the target of a data transmission by the transmitting node or by a pre-designated node of the local contention neighborhood 10. Each CS also ends with an inter-slot spacing period in which no nodes 1 . . . k of the local contention neighborhood 10 transmit.

Figure 3A:
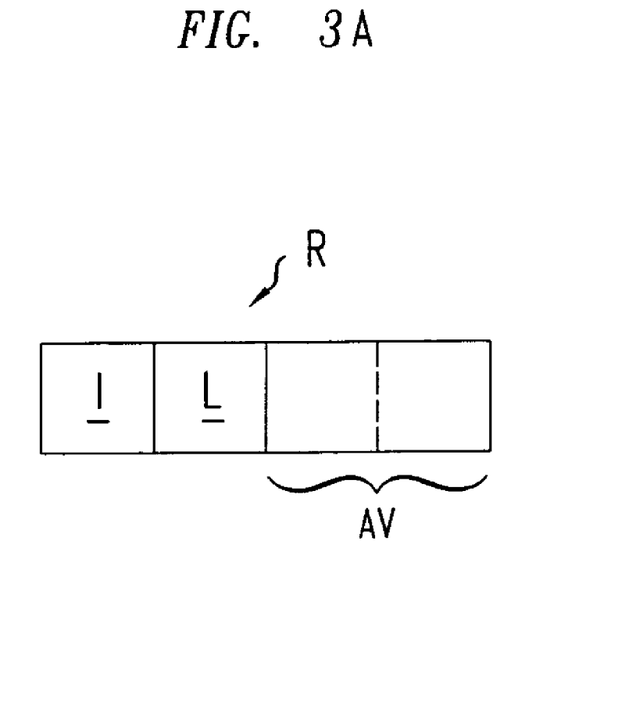
FIG. 3A schematically shows the form of a transmission that requests a channel reservation in the local contention neighborhood of FIG. 1.

Referring to FIG. 3A, a transmission of a request (R) for a channel reservation carries several information fields. The information fields includes a field (I) for the identity of the node transmitting the request, a field (L) for the length of the data frame whose transmission is being requested, and a field (AV) for one or more access variables at a time slot "t". Here, "t" is a slot time that is earlier than the time at which the request was transmitted, e.g., t+1. Exemplary access parameters include a contention level variable, $W_k(t)$; an urgency function, $f(q_k(t), T(t))$; and a threshold $T(t)$, which are defined below.

Referring to FIG. 2, in some CSs, two or more requests for channel reservations will collide. See e.g., requests R1 and R2. If such a collision occurs, both requests are typically garbled at the target node 1 . . . k. For that reason, each transmitting node 1 . . . k retransmits its request during a later CS.

In some CSs, only one node 1 . . . k transmits a request R, and the target node 1 . . . k receives the request without garbling. Then, the target node 1 . . . k determines whether to grant the request. If the target node 1 . . . k decides to grant the request, the target node 1 . . . k transmits a grant (G) to the local contention neighborhood during the next CS. The target node 1 . . . k will retransmit the grant if the transmission of the grant collides with another transmission during the same CS. Both the requesting node 1 . . . k and the other nodes 1 . . . k monitor the local contention neighborhood 10 for transmissions of grants of channel reservations.

Figure 3B:
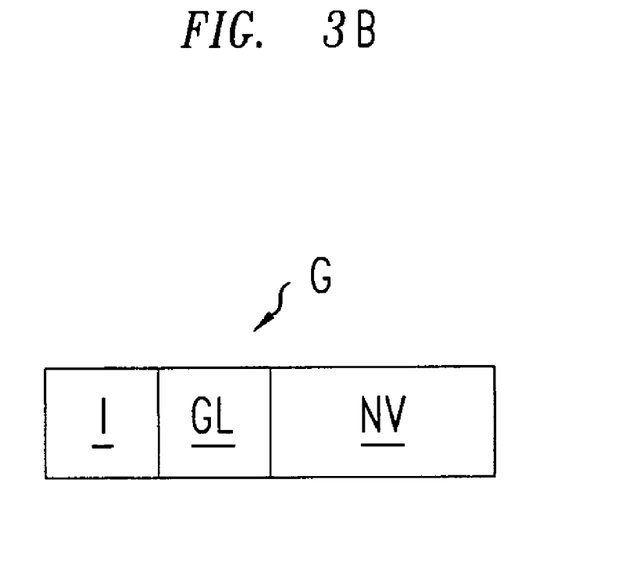
FIG. 3B schematically shows the form of a handshake transmission that grants a channel reservation in the local contention neighborhood of FIG. 1.

Referring to FIG. 3B, a transmission for a grant (G) of a channel reservation has several information fields. The information fields include a field (I) for the identity of the node granted the channel reservation, a field (GL) for the granted length of the data frame to be transmitted, and a field (NV) for new values of access parameters in the entire local contention neighborhood 10. The new values include an access threshold T and/or contention level W.

Referring again to FIGS. 1 and 2, other embodiments use PCCs that are unslotted. In the unslotted embodiment, protocols are related to the above-described protocols for slotted PCCs in a manner that is similar to the relation of the normal Aloha protocol to the slotted Aloha protocol. In particular, during the unslotted PCCs, nodes 1 . . . k transmit requests for channel reservations after random wait periods whose average lengths are determined by access probabilities associated with individual ones of the nodes 1 . . . k. Also, the target node 1 . . . k for a request will transmit a grant of a channel reservation during the same unslotted PCC.

Referring again to FIG. 2, the nodes 1 . . . k monitor for transmissions of grants (G) in local contention neighborhood 10. The monitoring tells the nodes 1 . . . k whether a node has been granted a channel reservation, the length of any reservation, and any changes to the access variables for the local contention neighborhood 10. From the length of a reservation, nodes that were not granted a reservation determine how long to refrain from transmitting to avoid collisions during the subsequent period for transmission of a data frame (PTDF). That is, the handshake protocol eliminates collisions in the PTDFs.

The node granted the channel reservation transmits a data frame to the target node k during the PTDF subsequent to the grant of the channel reservation. The PTDF may be much longer than the period for channel contention (PCC). At the end of the PTDF, a new series of CSs commences so that the nodes 1 . . . k can compete for the next channel reservation.

Referring to FIGS. 1 and 2, contention between nodes 1 . . . k of the local contention neighborhood 10 is regulated during the PCCs to reduce bandwidth losses associated with collisions between transmissions associated with requests and grants of channel reservations. In particular, each node 1 . . . k of the local contention neighborhood 10 stores and dynamically updates a set of access variables that control contention in the PCCs. In node "j", the stored and dynamically updated set of access variables determines the probability $p_j(t)$ that node "j" will transmit a request for a channel reservation in response to having a data frame waiting for transmission or transmit a grant of a received request. In slotted embodiments, the variable $p_j(t)$ defines the probability that the node "j" will transmit the request or grant in the next CS, i.e., the contention slot at time "t+1". In unslotted embodiments, the variable $p_j(t)$ defines the average rate that the associated node "j" will transmit a request or grant in the same PCC. For each node "j", the request probability, $p_j(t)$, has the form:

$$p_j(t) = \mathrm{minimum}\left\{\frac{f(q_j(t), T(t))}{W(t)}, 1\right\}.$$

Thus, $p_j(t)$ depends through a service differentiation function "f" on a channel access priority variable, $q_j(t)$ and on channel access variables, e.g., $W(t)$ and $T(t)$. The channel access priority, $q_j(t)$ characterizes the individual node "j". The channel access variables, which include a contention level, $W(t)$, and may also include an access threshold $T(t)$, characterize the entire local contention neighborhood. The service differentiation function "f" is fixed for the nodes 1 . . . k and is typically a non-decreasing function of the channel access priority, e.g., $q_j(t)$.

In various embodiments, the service differentiation function, f, will have different forms.

In one embodiment, service differentiation functions of all nodes that can send packets are equal to 1. Then, the access priority, $p_j(t)$, of a node "j" satisfies $p_j(t) = $minimum $\{1/W(t), 1\}$ where $W(t)$ is the contention level variable for the local contention neighborhood 10. In this case, each node 1 . . . k of the local contention neighborhood 10 has the same priority for accessing the shared wireless channel during the PCCs. That is, each node 1 . . . k has the same probability of transmitting a request for a channel reservation in response to having a data frame queued for transmission and has the same probability of granting a channel reservation in response to having received a request for the channel reservation. Thus, the value of $W(t)$ fixes the overall contention level during the CS time slots. That is, during the PCCs, the access probabilities $\{p_j(t)\}$ and the associated nodes 1 . . . k of the neighborhood 10 and are adapted to produce higher levels of contention, i.e., more transmissions, for lower values of $W(t)$ and to produce lower levels of contention, i.e., less transmissions, for higher values of $W(t)$.

The nodes 1 . . . k also obey a protocol that dynamically updates stored values of $W(t)$. The protocol may be configured to maintain $W(t)$ so that $\Sigma_{j \in nodes} p_j(t) \approx 1$, e.g., to optimize the transmission throughput in PCCs.

In other embodiments, the service differentiation function is proportional to a node's channel access priority and inversely proportional to the contention level. Thus, for a node "j", $f(q_j(t), T(t)) = q_j(t)/W(t)$. Here, each $q_j(t)$ is a channel access priority that is associated with the associated node "j". The channel access priorities may be constant or may depend non-trivially on the associated node's state. For example, $q_j(t)$ may represent the length of the queue of waiting data frames at the node j; the longest wait time of a data frame at node "j"; or related to the channel service rate provided to the node "j". Assigning one channel access priority $q_j(t)$ to node "j" and a different channel access priority $q_k(t)$ to node "k" causes nodes "j" and "k" to have different abilities to transmit requests and grants during the CS time slots. Thus, the access priorities, $\{q_j(t)\}$, implement service that differentiates the different nodes 1 . . . k of the local contention neighborhood 10, i.e., different nodes have different abilities to access the shared channel.

In some embodiments, the service differentiation function has a threshold form so that each node "j" has a channel access probability defined by: $p_j(t) = b \cdot \Theta(q_j(t) - T(t))/W(t)$. Here, $\Theta(x)$ is a threshold function of x and $W(t)$ and $T(t)$ are the contention level variable and threshold variable for the entire local contention neighborhood 10. Exemplary, threshold functions include the step function: $\Theta(x) = 1$ for $x \geq 0$ and $\Theta(x) = 0$ for $x < 0$; the function $\Theta(x) = [\exp(-x) + 1]^{-1}$; and other functions with a smoothed step form. The threshold functions implement a type of service differentiation in the local contention neighborhood 10. The service differentiation ensures that nodes whose channel access priorities are lower than the approximate value of the threshold variable do not obtain substantial access to the shared wireless channel, i.e., nodes whose channel access priorities are above the value of the threshold obtain a much larger access to the channel.

In various embodiments, nodes 1 . . . k of the local contention neighborhood 10 use various methods to dynamically update the stored values of variables $p_j(t)$, $q_j(t)$, $T(t)$ and/or $W(t)$. The methods provide for regulation of contention levels in the local contention neighborhood 10 during the CSs. Nevertheless, the local contention neighborhood 10 operates according to a distributed scheduling scheme.

Figure 4A:
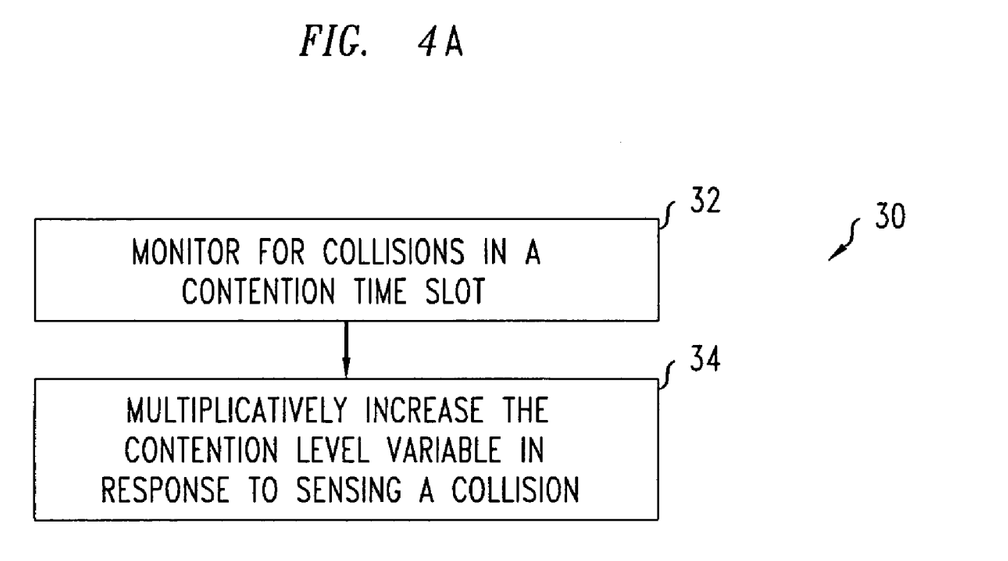
FIGS. 4A and 4B illustrate methods the nodes of the local contention neighborhood of FIG. 1 use to update stored values of a contention level variable.
Figure 4B:
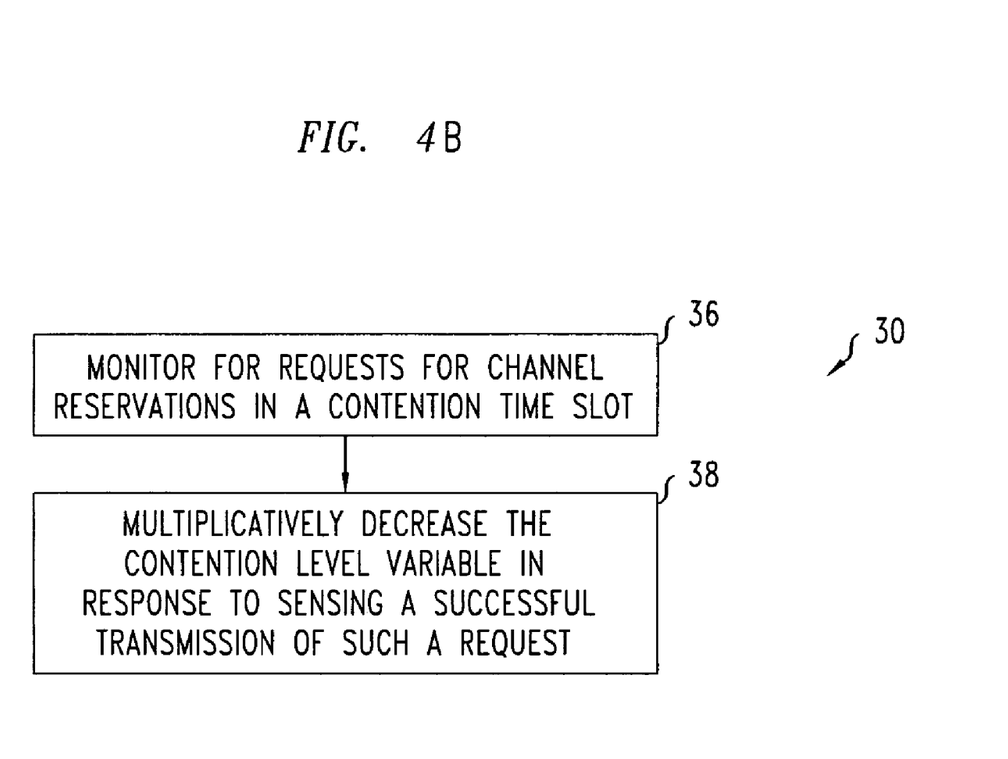

First, FIGS. 4A and 4B illustrate a method 30 for dynamically update the value of the contention level $W(t)$ variable that is stored in nodes 1 . . . k. The update method 30 is responsive to contention conditions in the local contention neighborhood 10.

According to the method 30, each node 1 . . . k monitors the local contention neighborhood 10 for collisions between requests and/or grants of channel reservations during CSs (step 32). For example, the nodes 1 . . . k may monitor transmission power levels to determine whether a collision has occurred. In response to sensing a collision, a node "j" multiplicatively updates its stored value for the contention level variable, $W(t)$ (step 34). This first type of multiplicative update has the form:

$$W(t+1) = (1+u)W(t) \text{ where } u > 0.$$

Here, t is the time index of CS having the collision, and t+1 is time index for the next CS. Thus, the dynamical update of $W(t)$ reduces competition for channel reservations in subsequent CSs.

According to the method 30, each node 1 . . . k monitors the local contention neighborhood 10 for successful transmissions of requests for channel reservations during CSs, e.g., by monitoring power levels (step 36). In response to sensing a successful transmission of such a request, a node "j" multiplicatively updates its stored value for the contention level variable, $W(t)$ (step 38). This second multiplicative update has the form:

$$W(t+1) = (1-d)W(t) \text{ where } 1 > d > 0.$$

This dynamical update of W will typically increase the rate of requests for channel reservations in subsequent CSs. Thus, the updates to stored values of the contention level variable W(t) in individual nodes 1 . . . k dynamically reconfigure the contention level in the local contention neighborhood 10 to conditions therein.

In method 30, the multiplicative factors (1+u) and (1−d) are typically defined over the entire local contention neighborhood 10. Preferred values for u and d may be found by studying the evolution of W(t). In one study, the inventors used a fixed-point approximation and also assumed that each node "j" had an access probability that satisfied: $p_j(t) = q_j/W(t)$, where the $q_j$ is a constant whose value depends on the individual node. For small u and d, a steady state solution of the fixed point approximation gave a transmission success probability under the condition that at least one transmission occurred during a time slot as: log(1+u)/[log(1+u)−log(1−d)]. Then, the largest value for this conditional probability was found to be 1/(e−1) if the number of nodes is large. Thus, selecting u and d to satisfy the constraint: [log(1+u)−log(1−d)]/log(1+u)≅e−1 may maximize the transmission throughput in a local contention neighborhood under the above-described conditions.

Multiplicative update method 30 tends to maximize throughput in the local contention neighborhood 10 as a function of the current number of active nodes 1 . . . k. Thus, the dynamical updates of stored values of W(t) should regulate contention in a manner that increases the effective bandwidth during the CSs. In contrast, the protocol of the 802.11 DCF abruptly reduces W(t) to a minimum value, $W_{min}$, in response to a successful transmission. The 802.11 DCF protocol for dynamically updating W(t) does not adjust to account for the current numbers of active nodes 1 . . . k in the local contention neighborhood 10. For that reason, the 802.11 DCF protocol tends to over-adjust W(t) upon sensing a successful transmission rather than smoothly matching the update to W(t) to changed conditions in the local contention neighborhood 10. The multiplicative update method 30 still responds rapidly to sensing a successful transmission. In particular, some conventional protocols have proposed additively decreasing stored values of W(t) by a constant in response to a successful transmission. The present multiplicative update method 30 is typically faster than the conventional additive decrease protocols, at least, for large starting values of W(t). For both of the above reasons, the method 30 may more efficiently reduce bandwidth losses when the contention level changes in the local contention neighborhood 10.

Second, during the PCCs, the handshake protocol between transmitting and receiving nodes 1 . . . k supports a method 40 for dynamically updating values of selected access variables that are stored in each node 1 . . . k of the local contention network 10. The selected channel access variables relate to properties of the entire local contention neighborhood 10 even though the stored values of these channel access variables may be different on individual ones of the nodes 1 . . . k.

Figure 5A:
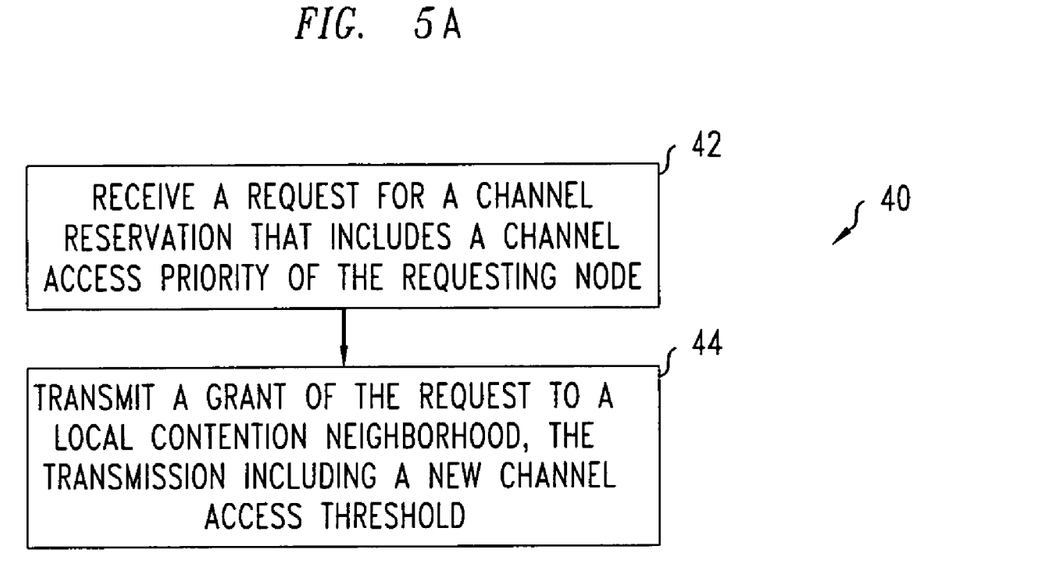
FIGS. 5A and 5B illustrate a method that uses the handshake protocol of FIG. 2 to dynamically updating stored values of channel access variables in the entire local contention neighborhood.
Figure 5B:
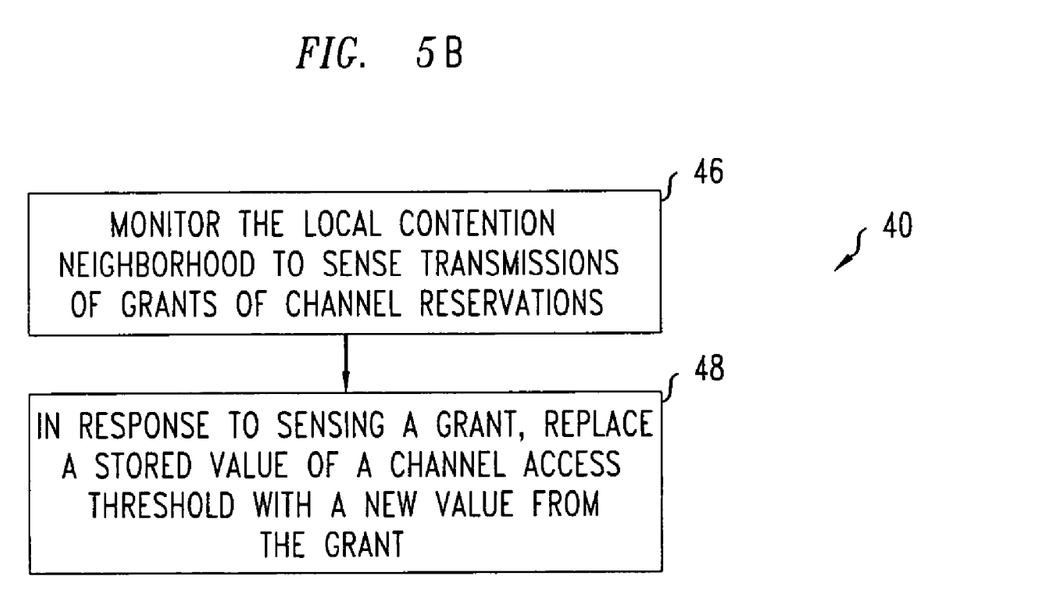

The method 40 includes steps performed by a node targeted by a request for a channel reservation, i.e., see FIG. 5A, and steps performed by other nodes of the local contention neighborhood, i.e., see FIG. 5B. The target node "k" receives a request for a channel reservation from a transmitting node "j" in the same local contention neighborhood 10 (step 42). The request includes a field (AV) that indicates values of selected access variables as stored at the node "j" at a time "t" earlier than transmission of the request. The selected access variables include a stored value of the channel access priority, $q_j(t)$ of the requesting node "j" and may include the maximum stored value of $\{W(t), f(q_j(t, T)\}$ at the node "j". Next, the target node "k" transmits a grant of a channel reservation to the entire local contention neighborhood 10 (step 44). The transmission of the grant includes a field (NV) with new values of selected channel access parameters as shown in FIG. 3B. The new values include a new value, T, for the channel access threshold variable and may include a new value, W, for the contention level. The target node "k" may determine the new values in the grant from the values in the field AV of the request for a channel reservation and/or may be determine said new values from its own information on access conditions of nodes in the local contention neighborhood 10. The other nodes "m" monitor the local contention neighborhood 10 and thus, sense the transmission of a grant of a channel reservation by the target node "k" (step 46). In response to receiving the transmitted grant, the other nodes "m" replace their own stored values for T(t) and/or W(t) with the new values T and/or W, respectively (step 48). After the transmission of a grant, each other node "m" and requesting node "j" replaces its stored values of T(t) and/or W(t) by new values as obtained from the grant of a channel reservation to a different node.

In some embodiments where the service differentiation function has a threshold form, the grant transmits a new value, T, that satisfies: $T = q_1(t)$ where $q_1(t)$ is the largest channel access priority known to the target node "k". Here, the largest $q_1(t)$ is the channel access priority of the target node "k", requesting node "j", or another node "n" of the local contention neighborhood 10. Such a new value of T along with a threshold form for the service differentiation function ensures that the nodes whose channel access priorities become higher than the currently highest known access priority will be given access to the shared channel and nodes whose channel access priorities are below the currently highest known channel access priority will be substantially denied or given relatively much less access to the shared channel.

In various embodiments, the grant transmits a new value, W, that corresponds to the largest value of the contention variable known by the target node "k" to be stored in the local contention neighborhood. Again, the largest stored value of W(t) may be the value stored in the target node "k", the requesting node "j", or another node "n" of the local contention neighborhood 10. Including this new value in the grant causes the values of W(t) that are stored in various ones of the nodes 1 . . . k, to be made uniform. The stored values of the contention level W(t) may become non-uniform during performance of the updating method 30 of FIGS. 4A-4B, because ones of the nodes 1 . . . k do not hear each successful transmission and each collision in the local contention neighborhood 10.

In other embodiments, each node 1 . . . k uses detected requests for channel reservations to update its own stored value of the channel access threshold. In particular, each node will extract the channel access priorities $q_j(t)$ of a requesting node from each request that the node detects. Each node will also dynamically update its own stored value for the channel access threshold to be equal to the highest value of the channel access priority from the requests that the node detects.

Referring to FIGS. 1 and 2, in some embodiments, the service differentiation function has a threshold form that causes throughput sharing among nodes 1 . . . k of a local contention neighborhood 10 of FIGS. 1-2. Herein, throughput sharing is a method that approximately ensures that each node "i" of the neighborhood 10 will obtain a preselected share of the channel reservations when the node "i" is backlogged by data frames waiting to be transmitted. In general, for the backlogged node "i" and another node "j", such throughput sharing implies the relation:

$$\frac{R_i(t_1, t_2)}{R_j(t_1, t_2)} \geq \frac{\omega_i}{\omega_j}.$$

In particular, if both nodes "i" and "j" are backlogged, throughput sharing implies the approximate relation:

$$\frac{R_i(t_1, t_2)}{R_j(t_1, t_2)} \approx \frac{\omega_i}{\omega_j}$$

Here, $R_i(t_1, t_2)$ and $R_j(t_1, t_2)$ are the rates of data transmission granted to node "i" and to node "j", respectively, during the time interval $[t_1, t_2]$. Also, the quantities $\omega_i$ and $\omega_j$ are preselected constants that define the quantitative form of the throughput sharing. Such throughput sharing could imply that the backlogged node "i" would receive, at least, $\omega_i/(\Sigma_j \omega_j)$ of the time for data transmission during the interval $[t_1, t_2]$.

To produce throughput sharing, the channel access priorities of the nodes 1 . . . k are defined to be equal to their effective access rate deficiencies. That is, an individual node "k" is configured to dynamically update its channel access priority, $q_k(t)$, to satisfy:

$$q_k \simeq 1 - \frac{\overline{R_k}}{\omega_k} \text{ where } \overline{R_k} = \frac{R_k(t_1, t_2)}{t_2 - t_1}.$$

Thus, the access priorities track data transmission rates that are served to the associated nodes. Since these embodiments use access probabilities with a threshold form, the channel access priorities will tend to remain near the threshold T during operation of the local contention neighborhood 10. Thus, the channel access priorities of two nodes "i" and "j" should tend satisfy: $q_i \approx T$ and $q_j \approx T$, respectively. These later relations imply the above-described throughput sharing relation.

In the local contention neighborhood, if the number of currently active nodes varies with time, the channel access priorities may be replaced by an estimated adaptive form and still produce an approximate form of throughput sharing. One estimated adaptive form is given by:

$$q_k(t+1) = (1-\alpha)q_k(t) + \alpha\{1 - C(\text{node ``}k\text{'' served at slot ``}t\text{''})/\omega_j\},$$

Here, $\alpha$ is the update temporal step size, which is positive, and C(x) equals 1 when its argument is true and equals 0 when its argument is false. A second estimated adaptive form dynamically changes a node's access priority only when the node has backlogged data frames for transmission. This second form is given by:

$$q_k(t) = (1-\alpha)q_k(t-1) + \alpha[C(\text{node ``}k\text{'' has a waiting data frame in slot ``}t\text{''}) - C(\text{``}k\text{'' has access to channel in slot ``}t\text{''})/\omega_k].$$

The above forms dynamically updating the channel access priorities $\{q_j(t)\}$ can also produce a form of throughput sharing.

Other embodiments of the invention will be apparent to those skilled in the art in light of the specification, drawings, and claims of this application.

What we claim is:

1. An apparatus, comprising:
a first node configured to transmit both data frames and requests for channel reservations to a local contention neighborhood of a network, the first node being configured to compete with other nodes of the neighborhood for reservations to the channel; and
wherein the first node is configured to:
dynamically update an access contention level from monitoring collisions between requests or grants of channel reservations from the other nodes during contention time slots;
dynamically update a stored value of an access priority for the first node that corresponds to the access contention level; and
transmit the requests with a rate responsive to the stored value of the access priority.

2. The apparatus of claim 1, wherein the first node is configured to transmit said requests with a rate that decreases as the access contention level in the local contention neighborhood increases.

3. The apparatus of claim 2, wherein the first node is configured to decrease a stored value of the access contention level by a preselected percentage in response to sensing a successful transmission of one of the requests by one of the nodes of the neighborhood.

4. The apparatus of claim 1, wherein the first node is configured to dynamically update a stored value of an access threshold and to transmit the requests in response to the stored value of the access priority being over a threshold fixed by a stored value of the access threshold.

5. The apparatus of claim 4, wherein the first node is configured to update the stored value of the access threshold in response to sensing a grant of a channel reservation to another node of the neighborhood.

6. The apparatus of claim 4, wherein the first node is configured to perform throughput sharing with other nodes of the local contention neighborhood.

7. The apparatus of claim 1, wherein said contention time slots occur during periods for channel contention (PCC), said data frames are transmitted during separate periods for transmission of data frames (PTDF), and wherein said PCC are interleaved with said PTDF.

8. A method, comprising:
storing a value of an access priority for a first node of a local contention neighborhood, the neighborhood having a plurality of other nodes that compete with the first node for access to a channel, wherein the access priority corresponds to a contention level of the neighborhood, the contention level dynamically updated from a monitoring of collisions between requests or grants of channel reservations from the plurality of other nodes during contention time slots;
transmitting a plurality of requests for reservations of the channel from the first node, the rate of the transmitting the requests depending on the stored value of the access priority; and
wherein the storing includes updating the stored value of the access priority between transmitting ones of the requests.

9. The method of claim 8, further comprising:
updating the stored access priority in a manner that causes throughput sharing between the first node and other nodes of the local contention neighborhood.

10. The method of claim 8, further comprising:
updating a stored access threshold between ones of the steps of transmitting requests; and
wherein each step of transmitting is responsive to the stored access priority being over a threshold fixed by the stored access threshold.

11. The method of claim 10, further comprising:
updating the stored access threshold responsive to sensing a grant of a reservation of the channel to one of the other nodes of the neighborhood.

12. The method of claim 8, wherein said contention time slots occur during periods for channel contention (PCC), data frames are transmitted during separate periods for transmission of data frames (PTDF), and wherein said PCC are interleaved with said PTDF.

13. A method, comprising:
monitoring for requests of channel reservation or grants of channel reservations to nodes of a local contention neighborhood and for collisions between the requests or grants, the monitoring being performed by one of the nodes; and
updating a value of an access threshold stored in the one of the nodes in response to the monitoring sensing a request or grant of a channel reservation to one of the other nodes, the updating replacing the stored value of the access threshold with a value obtained from the sensed request or grant; and
transmitting a request for a channel reservation from the one of the nodes in response to an access priority of the one of the nodes passing a threshold associated with the stored value of the access threshold, wherein the access priority corresponds to a contention level of the neighborhood, the contention level dynamically updated from the monitoring of collisions during contention time slots.

14. The method of claim 13, wherein said contention time slots occur during periods for channel contention (PCC), data frames are transmitted during separate periods for transmission of data frames (PTDF), and wherein said PCC are interleaved with said PTDF.

15. A system for distributed scheduling, comprising:
a plurality of nodes belonging to a local contention neighborhood, each node being configured to transmit requests for channel reservations and data frames to other nodes of the neighborhood and being able to compete with the other nodes for access to the channel; and
wherein each node is configured to:
store a value for an access contention level in the neighborhood, the stored value dynamically updated from a monitoring of collisions between the requests or grants of channel reservations from the plurality of nodes during contention time slots;
transmit the requests at a rate that decreases as the stored value increases; and
decrease the stored value in a manner proportional to the stored value in response to sensing a successful transmission of a request for a channel reservation between two of the nodes in the neighborhood.

16. The system of claim 15, wherein each node is configured to increase the stored access contention value in a manner proportional to the stored access contention value in response to sensing a collision of two requests for channel reservations in the neighborhood.

17. The system of claim 15, wherein the each node having a probability for requesting a channel reservation that depends on the stored value.

18. The system of claim 17, wherein the each node is configured to store a value of an access threshold and to request a channel reservation in response to the access priority associated with the same node being over a threshold defined by the value of the access threshold stored by the same node.

19. The system of claim 15, wherein said contention time slots occur during periods for channel contention (PCC), said data frames are transmitted during separate periods for transmission of data frames (PTDF), and wherein said PCC are interleaved with said PTDF.

20. A method for operating a node in a wireless network, comprising:
receiving a request for a channel reservation from a first node of a local contention neighborhood of the network, wherein the request includes an access priority corresponding to a contention level of the neighborhood, the contention level dynamically updated from a monitoring of collisions between requests or grants of channel reservations from nodes in the neighborhood during a contention time; and
transmitting a grant of the channel reservation to the local contention neighborhood in response to the deciding to grant the request from the first node; and
wherein the transmitted grant includes a new value of a channel access threshold for the neighborhood, nodes of the neighborhood having access priorities below a threshold fixed by the channel access threshold being unable to transmit a request for a channel reservation.

21. The method of claim 20, wherein the transmitting includes determining the new value of the channel access threshold from a value of an access priority in the request from the first node.

22. The method of claim 20, wherein said contention time slots occur during periods for channel contention (PCC), data frames are transmitted during separate periods for transmission of data frames (PTDF), and wherein said PCC are interleaved with said PTDF.

23. A system, comprising:
plurality of nodes capable of transmitting data frames in a local contention neighborhood of a wireless network, the nodes being configured to compete with each other for access to a shared channel of the wireless network; and
wherein each node is configured to store and dynamically update an associated access priority variable, the access priority variable corresponding to a contention level of the neighborhood which is dynamically updated from a monitoring of collisions between requests or grants of channel reservations from the plurality of nodes during contention time slots, a probability of one of the nodes of requesting access to the channel depending on a value of the access priority variable stored in the one of the nodes.

24. The system of claim 23, wherein each node is configured to monitor for requests of channel accesses or grants of channel accesses to the other nodes in the local contention neighborhood and to update its stored value of the access threshold variable responsive to sensing one of the requests or grants.

25. The system of claim 23, wherein each node is configured to store and dynamically update a value of an access threshold for the neighborhood, one of the nodes being configured to request access to the channel in response to the value of access priority stored by the one of the nodes being over a threshold defined by a value of the access threshold variable stored by the same node.

26. The system of claim 23, wherein said contention time slots occur during periods for channel contention (PCC), said data frames are transmitted during separate periods for transmission of data frames (PTDF), and wherein said PCC are interleaved with said PTDF.

* * * * *